Figure 1:
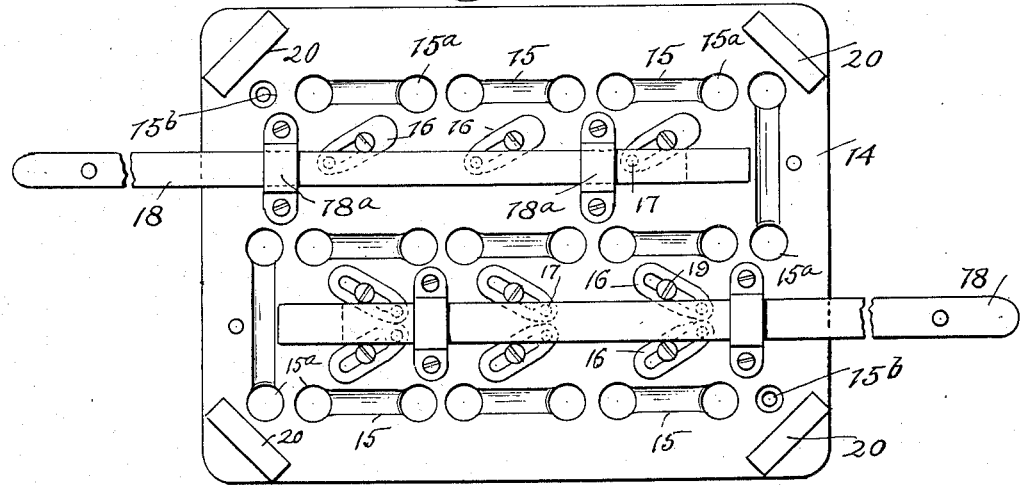

June 16, 1925.  1,542,405
W. B. PETTIBONE
APPARATUS FOR AND METHOD OF APPLYING CROSS CONNECTERS TO STORAGE
BATTERY TERMINAL POSTS
Filed June 17, 1922   4 Sheets-Sheet 1

Inventor
Ward Burton Pettibone
by
Thurston Bates Hansen
attys.

June 16, 1925.                                                 1,542,405
W. B. PETTIBONE
APPARATUS FOR AND METHOD OF APPLYING CROSS CONNECTERS TO STORAGE
BATTERY TERMINAL POSTS
Filed June 17, 1922.            4 Sheets-Sheet 2
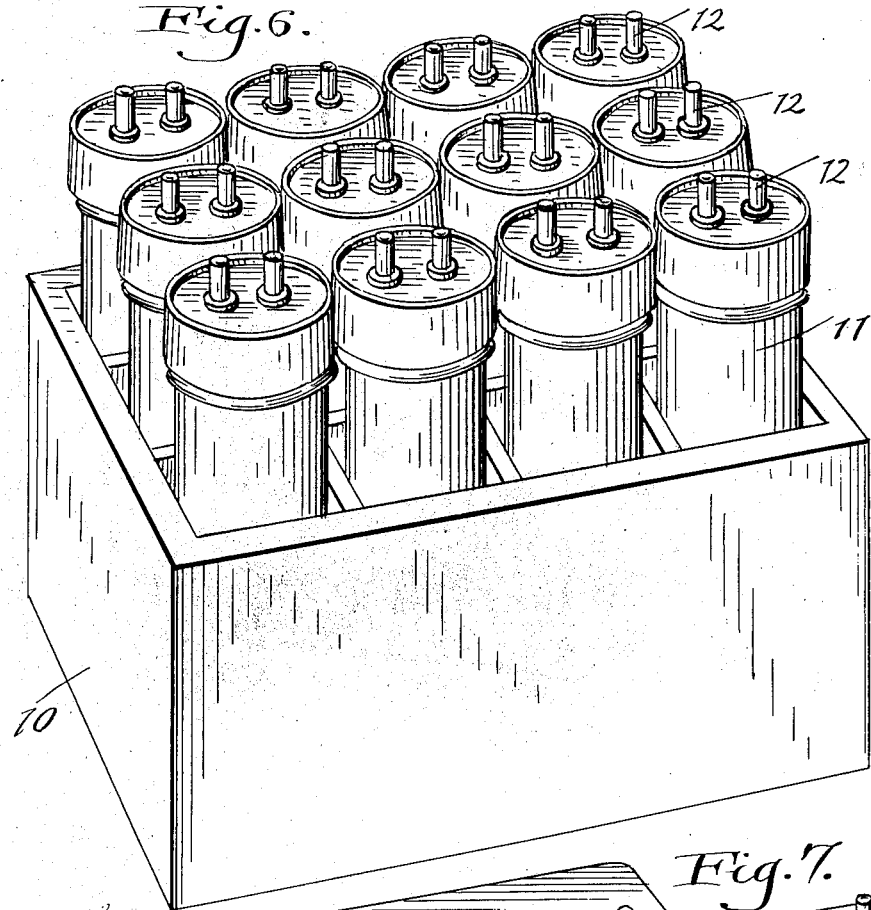
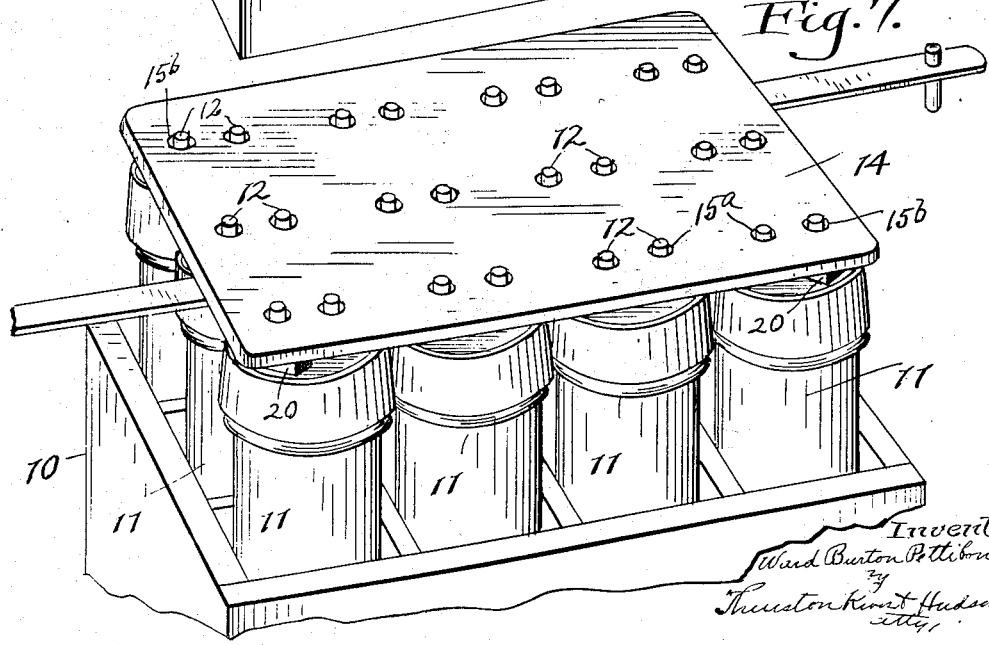

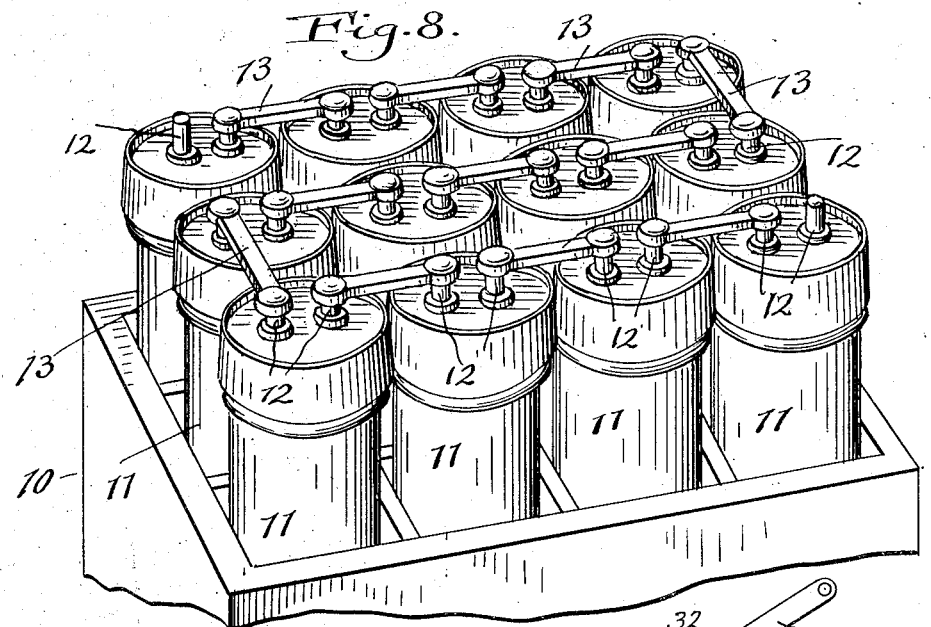
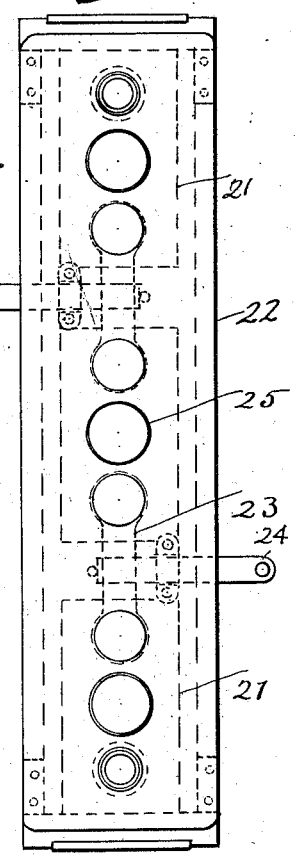
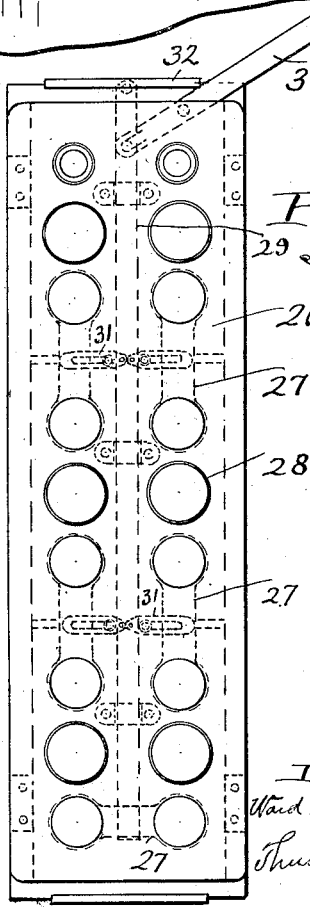

Patented June 16, 1925.

1,542,405

UNITED STATES PATENT OFFICE.

WARD BURTON PETTIBONE, OF CLEVELAND, OHIO, ASSIGNOR TO WILLARD STORAGE BATTERY COMPANY, OF CLEVELAND, OHIO, A CORPORATION OF WEST VIRGINIA.

APPARATUS FOR AND METHOD OF APPLYING CROSS CONNECTERS TO STORAGE-BATTERY TERMINAL POSTS.

Application filed June 17, 1922. Serial No. 568,951.

*To all whom it may concern:*

Be it known that I, WARD BURTON PETTIBONE, a citizen of the United States, residing at Cleveland, in the county of Cuyahoga and State of Ohio, have invented a certain new and useful Improvement in Apparatus for and Methods of Applying Cross Connecters to Storage-Battery Terminal Posts, of which the following is a full, clear, and exact description.

This invention relates to an apparatus for and method of applying and lead burning cross connecters to the terminal posts of a multi-cell storage battery, and has for its chief object to reduce the time and labor involved in applying and lead burning the cross connecters to the terminals of adjacent cells, and to increase the efficiency of the lead burning operation.

Still further the invention aims to provide means whereby more satisfactory and more uniform work can be done in lead burning the cross connecters to the posts, and the necessity for skilled workmen is eliminated.

In connecting together the posts of adjoining cells of a storage battery having a plurality of cells, so-called cross connecters are employed each consisting of a bar of lead or antimony lead provided at its ends with openings which are designed to receive the posts to be connected together. After the cross connecters are fitted onto the posts they are generally lead burned thereto to connect the cells in series, leaving two terminal posts one for each of the two end cells of the entire series to which outside or flexible conductors are designed to be attached.

Inasmuch as the cross connecters are applied individually and are lead burned individually to the terminal posts, a good deal of time and labor have heretofore been required to accomplish these operations, and a more or less skilled operator is required, for otherwise an unsatisfactory job would be done, and even with a skilled operator doing the work the posts and cross connecters are at times not uniformly lead burned together.

The present invention contemplates the use of a form recessed on one side to receive the cross connecters for a battery having a given number of cells and arranged in a given way, and provided with openings with which the openings in the ends of the cross connecters are adapted to register. This form is adapted to receive the cross connecters and then to be placed over the terminal posts of the battery with the posts projecting through the openings of the form and through the openings of the cross connecters.

The form is reversed or turned upside down after the cross connecters are placed in the recesses and before the form is placed over the posts so that when the operator is ready to perform the lead burning operation the form constitutes a protecting plate through which only the ends of the terminal posts project with the ends only of the cross connecters exposed, the portion of the form or plate around each post serving as a guard and in effect as a mold enabling the flame to be directed with more precision to just the desired point and avoiding the likelihood of more than the right amount of lead being melted.

To facilitate this operation, and particularly to prevent the cross connecters dropping out of the recesses of the form plate when the latter is turned upside down prior to being placed over a battery, a series of holding fingers or equivalent holding devices are provided on what is nominally the under side of the form, and these devices are movably arranged and are designed to be shifted from under the connecters after the latter have been lead burned to the posts so as to permit the form to be lifted from the battery, leaving the connecters in place, each properly lead burned to the two posts which it is designed to connect and with all the connecters at the same height or level.

The invention may be further briefly summarized as consisting in certain novel details of construction, and combinations and arrangements of parts which will be described in the specification and set forth in the appended claims.

Figure 2:
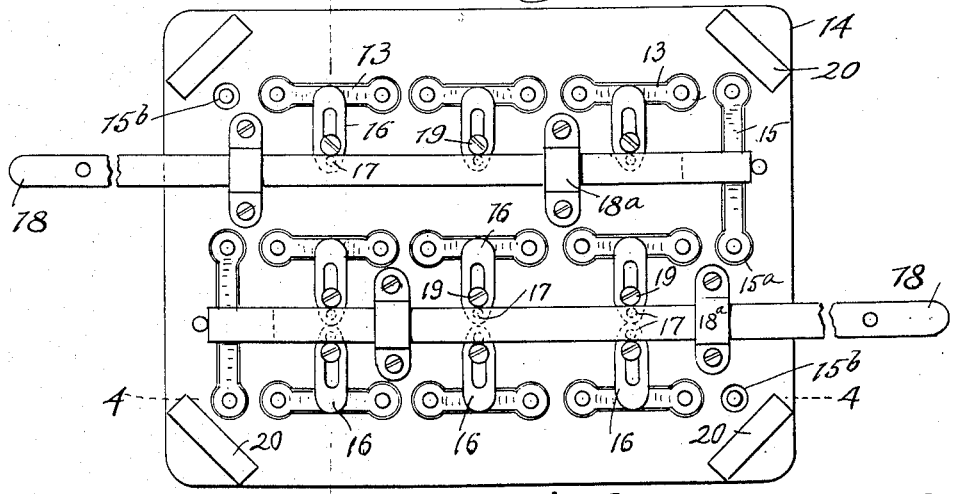
Figures 3, 4, 5:
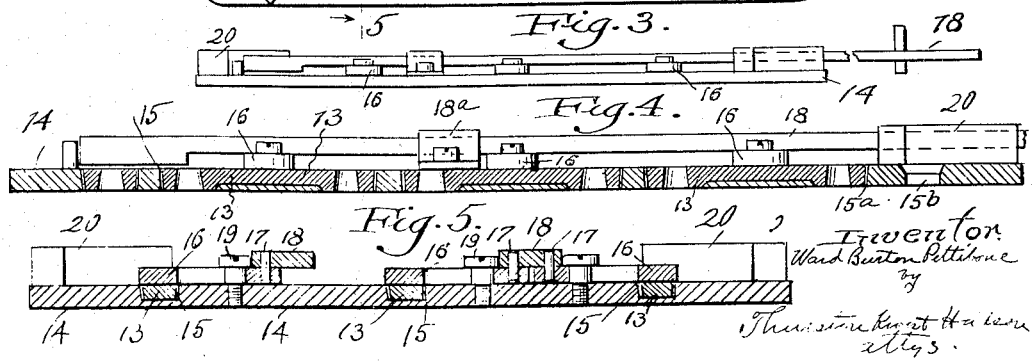

In the accompanying sheets of drawings illustrating the preferred embodiment of the invention, Fig. 1 is a view of the under side of the form before the connecters are applied, and with the holding fingers in inoperative position; Fig. 2 is a similar view after the recesses have received the cross connecters and showing the holding devices moved to operative position to hold the cross connecters in place to permit the guard with its cross connecters to be placed over a battery; Fig. 3 is an edge view of the same; Figs. 4 and 5 are transverse sectional views on an enlarged scale along the lines 4—4 and 5—5 of Fig. 2; Fig. 6 is a perspective view showing a battery composed of twelve cells arranged in three rows of four each, this view showing the upstanding terminal posts before they are connected by the cross connecters; Fig. 7 is a similar view with the guard placed over the battery or in position for the lead burning operation; Fig. 8 is a similar view after the lead burning operation, the guard having been lifted from the battery leaving the cross connecters in place; Figs. 9, 10, 11 and 12 are views looking down onto batteries of different constructions than illustrated in Fig. 6, and having cells differently arranged, forms similar in principle to that shown in Figs. 1 to 5 being applied to the tops of the batteries; and Fig. 13 is a sectional view along the line 13—13 of Fig. 12, looking in the direction indicated by the arrows.

My invention may be used for batteries having any number of cells arranged in any manner, and may be utilized advantageously with cells of any desired size. It is particularly useful for batteries intended for radio work having a large number of small cells designed to be connected by small cross connecters, but it is equally or substantially equally useful with larger batteries such as are used for starting and lighting work.

In Figs. 6, 7 and 8 I have shown a battery composed of a box or case 10 containing in this instance and by way of example only, twelve cells 11, arranged in three rows of four each. Each cell has a pair of upstanding terminal posts 12, which in the completed battery are connected by cross connecters 13 as illustrated in Fig. 8. Each cross connecter usually consists as herein illustrated, of a flat bar provided at its ends with substantially circular enlargements having openings extending therethrough to receive two terminal posts, and after the cross connecters have been placed over the posts they are lead burned thereto by an operator applying the flame separately to each end of each cross connecter until the lead burning is completed for the battery.

Taking up now the parts directly involving my invention, I employ a guard in the form of a plate 14, the size and shape of which will depend upon the size, number, arrangement and spacing of the cells. On the under side of the plate I provide a series of recesses 15 shaped to correspond to the shape of the cross connecters and arranged precisely as the cross connecters are arranged at the top of the completed battery after the cross connecters have been lead burned to the post. These recesses into which the cross connecters are designed to be slipped, extend part way through the plate, and at the ends thereof there are circular openings 15$^a$ which extend entirely through the plate and receive the ends of the cross connecters 13. For a battery having twelve cells arranged as illustrated, there are eleven recesses for the cross connecters, and in addition at opposite corners there are a pair of openings 15$^b$ designed to receive the two terminal posts to which the positive and negative outside conductors are adapted to be connected. The depth of the recesses is such that when the cross connecters are placed therein the upper surfaces of the cross connecters are flush with the face of the plate. That is to say, the depth of the recesses is the same as the thickness of the cross connecters.

In order that the cross connecters may be held in the recesses when the plate is turned upside down or reversed with respect to the position shown in Figs. 1 and 2, preparatory to placing the plate with its cross connecters over the battery, I provide on the under side of the plate means for temporarily holding the connecters in place, and though this means may assume different forms, in this instance the holding means consists chiefly of a series of fingers 16 pivotally connected at 17 to a pair of sliding bars 18 which project out beyond the ends of the plate. These bars are guided for endwise movement in guides 18$^a$ attached to the under side of the plate so that they can be moved inwardly to holding position and outwardly to inoperative or releasing position. Each holding finger 16 has a slot and it receives a pin 19 extending up from the bottom of the plate, the arrangement being such that when the bars are pulled outward the fingers are shifted to a diagonal position alongside the bars and out of overlapping arrangement with respect to the recesses 15 which receive the cross connecters. But when the bars are moved inwardly, the fingers are by a camming action swung outwardly to a position at right angles to the bars, in which event their outer ends overlap the middle portions of the recesses 15 and therefore extend over the cross connecters when the latter are seated in the recesses and prevent the cross connecters dropping out of the recesses when the plate is turned upside down.

With the arrangement of cells shown, that is to say, with the cells arranged in three rows, there are two groups of fingers connected to one bar to take care of the cross connecters in two rows, and a single group of fingers connected to the other bar to take care of the cross connecters in the third row, but, of course, with a different number of rows of cells a different arrangement suitable thereto will be employed. It should be observed that the two cross connecters which connect together the cells of adjoining rows and arranged adjacent opposite ends of the plate are held in place by the ends of the bars themselves, and not by fingers which hold in place the cross connecters arranged in the three parallel rows.

Additionally the plate is provided on its under side with lugs 20 which serve as feet, adapted to rest on the covers of the four corner cells of the group.

In operation with the parts in the position shown in Fig. 1, the operator places the cross connecters in the recesses of the form plate. Then the bars 18 are moved inwardly to lock the cross connecters in place. Then the form plate is turned upside down and placed over the terminal posts 12 of the battery as shown in Fig. 7. The terminal posts now project up into and slightly above the circular openings of the form plates and through the circular openings in the ends of the cross connecters, there now being exposed through the upper side of the plate merely the ends of the terminal posts and the end portions of the cross connecters which are to be lead burned thereto.

It should be noted in passing, that the cross connecters all stand at precisely the same level, and it will be obvious therefore, that when they are lead burned to the battery they will all be in the same plane or at the same level, a condition which does not exist ordinarily when the cross connecters are individually applied by the old method now in vogue.

Then the operator with a single flame, or if desired, with a plurality of flames which are directed through the openings in the top face of the form plate lead burns the cross connecters to the terminal posts, the flame or flames being directed onto the lead visible through the openings in the plate, and therefore being confined to the parts onto which it is desired that the flame be directed. In this manner the heat is applied only onto the parts to be directly lead burned together and the walls of the circular openings of the form plate serve as small molds to retain the fluid metal, with the result that after the lead burning is completed for a battery the different posts and cross connecters are substantially uniformly lead burned together.

When the lead burning has been completed, the operator moves the bars 18 outwardly, shifting the fingers and the ends of the bars from underneath the cross connecters so as to release them, and then lifts the plate from the batteries, whereupon the cross connecters remain in place on the terminal posts as shown in Fig. 8.

In Figs. 9 to 13 I have shown my invention applied to starting and lighting batteries having different numbers and arrangements of cells. In Fig. 9 the battery is provided with three cells indicated by dotted lines at 21, these cells being arranged end to end. The form plate 22 adapted to receive the connecters is elongated and corresponds substantially to the shape of the battery box or case, and in this instance the plate is provided with only two recesses, indicated by dotted lines at 23, to accommodate the two cross connecters needed to connect together the three cells. In this case the cross connecters are designed to be held in place in the recesses by a pair of sliding bars 24 which are pushed inwardly to hold the cross connecters in place and are pulled outwardly to release them.

When my invention is applied to starting and lighting batteries, or any other batteries having upstanding vent plugs, the form plate is preferably provided with openings indicated at 25 to allow the vent plugs to project freely through the plate.

The battery shown in Fig. 10 has six cells arranged in two rows with the cells of each row end to end as in Fig. 9. In this case the form plate designated 26 has five recesses 27 to receive the cross connecters, and has openings 28 to receive the vent plugs of the cells. In this instance the cross connecters are held in place by a longitudinally extending bar 29 which is operated by a swinging lever 30 having a pin and slot connection with the bar, the bar serving to operate locking fingers 31, similar to those first described, and the end of the bar being adapted to hold in place the connecter located at one end of the battery and designed to connect together the two rows of cells The lever 30 for operating the bar 29 is provided for the reason that the bar is in line with the handles 32 at the ends of the battery box, the arrangement being such that the handles will not interfere with the operation of the connecter holding and releasing means.

Figure 11:
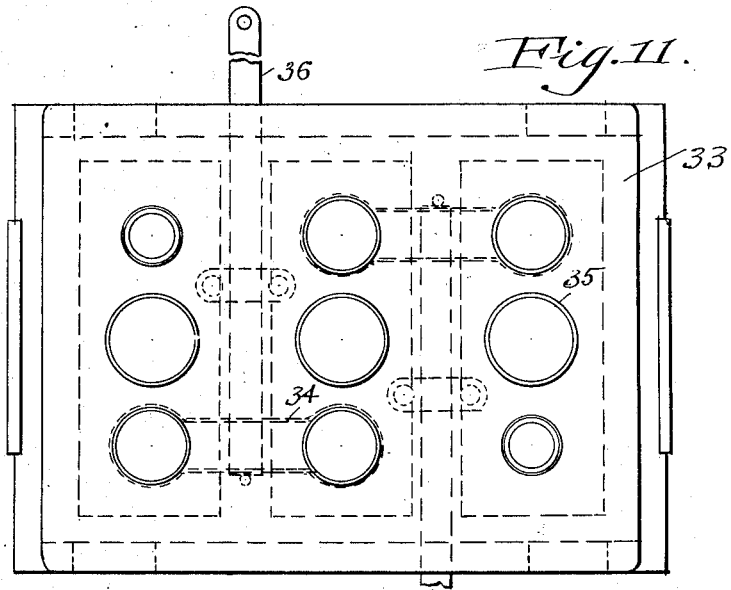

In Fig. 11 I have shown a battery composed of three cells arranged side by side. In this figure, the form plate is designated 33, this plate having recesses 34 to receive the two cross connecters necessary to connect the three cells, and having as in prior instances, openings 35 to receive the vent plugs of the cells. With this arrangement the cross connecters are locked and released by sliding bars 36.

Figure 12:
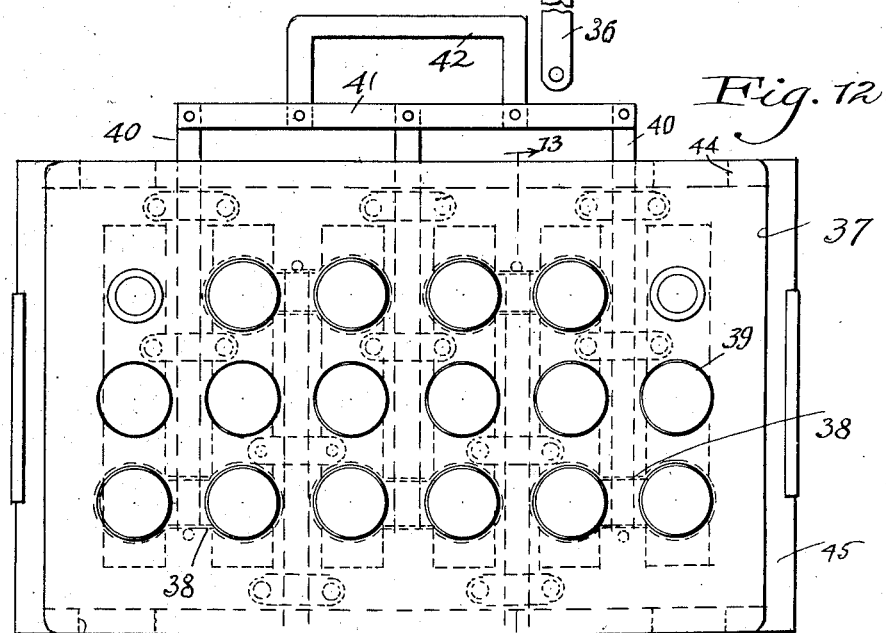
Figure 13:
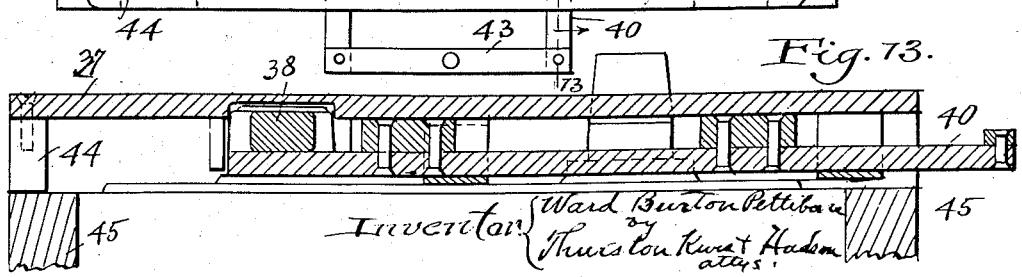

In Fig. 12 I have shown a battery containing six cells arranged side by side. In this instance the form plate 37 is provided with five recesses 38 to receive the cross connecters, and with openings 39 to receive the vent plugs of the cells. In this case the cross connecters are designed to be held in place by sliding bars 40 adapted to be moved in and out laterally of the plate as in Fig. 11. In this case, however, five sliding bars are required, and for convenience three of these bars are connected together by a cross bar 41 and an operating handle 42, and the other two are connected together by an operating handle 43.

In Fig. 13 I have shown a cross sectional view of the form plate of Fig. 12. It will be observed that the plate is provided on its under side with legs or feet 44 which rest on the top of the battery box or case which is here designated 45. The form plates of Figs. 9, 10 and 11 will be similarly supported on the battery box.

With batteries such as illustrated in Figs. 9, 10, 11 and 12, the cross connectors of necessity have greater thickness than the smaller cross connectors used with batteries such as illustrated in Figs. 5, 6, 7 and 8, and to avoid having an objectionable weight, the form plates may be of less thickness than the cross connectors, and this is illustrated in Fig. 13.

Thus it will be seen that the several objects stated at the beginning of the specification are attained very effectively, and as a result better work is accomplished than by the old methods, more satisfactory batteries are produced, and the cost of production is materially decreased.

I do not desire to be confined to the precise details shown, but aim in my claims to cover all modifications which do not involve a departure from the spirit and scope of my invention as set forth in the appended claims.

Having described my invention, I claim:

1. A device for facilitating the application of previously formed cross connecters to the terminal posts of a multi-cell storage battery, comprising a cross connecter holder adapted to be placed over a battery and having a plurality of recesses into which cross connecters may be placed, said recesses having an arrangement corresponding to the arrangement of the cross connecters on a completed battery of a number of cells arranged in a predetermined manner whereby the connecters may be assembled simultaneously on the terminal posts.

2. A device for facilitating the application of previously formed cross connecters to the terminal posts of a storage battery having a plurality of cells, comprising a plate adapted to be placed over the battery and provided on one side with a plurality of recesses in which cross connecters are adapted to be placed, said recesses having an arrangement corresponding to the arrangement of the cross connecters on the completed battery, said recesses extending entirely through the plate at the ends thereof so that the terminal posts may be extended therethrough whereby the connecters may be assembled simultaneously on the terminal posts.

3. A device for facilitating the application of previously formed cross connecters to the terminal posts of a multi-cell storage battery, comprising a plate having openings or recesses to temporarily receive the cross connecters of a battery and arranged in the plate in accordance with the arrangement of cross connecters of the finished battery, and means for releasably holding the cross connecters in said recesses.

4. A device for facilitating the application of previously formed cross connecters to the terminal posts of a multi-cell storage battery, comprising a plate having openings or recesses to temporarily receive the cross connecters of a battery and arranged in the plate in accordance with the arrangement of the cross connecters of the finished battery, and means shiftable to operative and inoperative position for retaining and releasing the cross connecters.

5. The method of applying previously formed cross connecters to the terminal posts of a storage battery having a number of cells, which comprises inserting the cross connecters in a holder with the former arranged in accordance with the arrangement that they are to have on the finished battery, placing the holder with the cross connecters over the battery with the ends of the cross connecters and ends of the terminal posts exposed through the holder, and then lead burning the cross connecters and the terminal posts together.

6. The method of applying cross connecters to the terminal posts of a storage battery having a plurality of cells, which comprises placing the cross connecters in recesses provided on one side of the plate, locking the cross connecters in the recesses, reversing the plate, placing it over a battery so that the ends of the terminal posts and ends of the cross connecters will be exposed through the top face of the plate and with the ends of the posts extending into the ends of the cross connecters, lead burning the posts and cross connecters together, unlocking the cross connecters, and lifting the plate from the battery.

In testimony whereof, I hereunto affix my signature.

WARD BURTON PETTIBONE.